(12) United States Patent
Horimai et al.

(10) Patent No.: US 7,719,952 B2
(45) Date of Patent: May 18, 2010

(54) OPTICAL INFORMATION RECORDING MEDIUM

(75) Inventors: Hideyoshi Horimai, Yokohama (JP); Yoshio Aoki, Yokohama (JP); Kazuhiko Kimura, Yokohama (JP); Atsushi Togo, Yokohama (JP); Yasuo Sakane, Yokohama (JP)

(73) Assignee: Optware Corporation, Kanagawa (JP)

( * ) Notice: Subject to any disclaimer, the term of this patent is extended or adjusted under 35 U.S.C. 154(b) by 1058 days.

(21) Appl. No.: 10/545,080

(22) PCT Filed: Feb. 6, 2004

(86) PCT No.: PCT/JP2004/001250

§ 371 (c)(1),
(2), (4) Date: Oct. 27, 2005

(87) PCT Pub. No.: WO2004/070714

PCT Pub. Date: Aug. 19, 2004

(65) Prior Publication Data

US 2006/0109774 A1 May 25, 2006

(30) Foreign Application Priority Data

Feb. 27, 2003 (JP) ............................ 2003-050645

(51) Int. Cl.
*G11B 7/24* (2006.01)
(52) U.S. Cl. .................................................. 369/275.1
(58) Field of Classification Search ........................ None
See application file for complete search history.

(56) References Cited

U.S. PATENT DOCUMENTS

| | | | | |
|---|---|---|---|---|
| 5,856,048 A | * | 1/1999 | Tahara et al. | 430/1 |
| 5,883,741 A | * | 3/1999 | Ono et al. | 359/495 |
| 6,084,845 A | * | 7/2000 | Mizuno | 369/112.28 |
| 2001/0030928 A1 | * | 10/2001 | Cheong et al. | 369/112.08 |
| 2004/0008302 A1 | * | 1/2004 | Moon | 349/115 |
| 2004/0100892 A1 | * | 5/2004 | Horimai | 369/103 |
| 2004/0257628 A1 | * | 12/2004 | Mukawa | 359/15 |

\* cited by examiner

*Primary Examiner*—Joseph H Feild
*Assistant Examiner*—Henok G Heyi
(74) *Attorney, Agent, or Firm*—William L. Androlia; H. Henry Koda

(57) ABSTRACT

An optical information recording medium having a structure in which irregular reflection of information light and recording/reproducing light from the reflective layer of an optical information record medium is prevented, thereby reducing the noise appearing on the reproduced image. The optical information recording medium for recording information by holography comprises a transparent substrate, a recording layer where information is recorded by an interference pattern, and a filter layer formed between the transparent substrate and the recording layer and adapted to transmit a light of a first wavelength and reflect a light of a second wavelength. The filter layer of the thus structured optical information recording medium transmits a light of the first wavelength (for example, red light) and reflects a light of the second wavelength (for example, green light). As a result, two lights of different wavelengths can be separated and used for different purposes without being influenced by each other.

9 Claims, 6 Drawing Sheets

OPTICAL INFORMATION RECORDING MEDIUM

BACKGROUND OF THE INVENTION

1. Field of the Invention

The present invention relates to an optical information recording medium wherein information is recorded utilizing holography. In particular, the present invention relates to a structure of an optical information recording medium wherein the generation of diffusive light from a reflective surface which causes various adverse effects is prevented when the reflective surface provided on the substrate of an optical information recording medium is irradiated with information light and recording/reproduction reference light.

2. Description of the Related Art

Holographic recording for recording information to a recording medium using holography is generally performed by superimposing light holding image information and reference light within the recording medium and writing the interference pattern formed at this time to the recording medium. When reproducing the recorded information, the image information is reproduced by diffraction due to the interference pattern by irradiating this recording medium with reference light.

One structure of an optical information recording medium implemented in this holographic recording is proposed in Patent Publication "Japanese Patent Laid-Open Publication No. 11-311936", released on Nov. 9, 1999. The optical information recording medium proposed in this patent publication comprises a servo pit 3 provided on plastic or glass substrate 1, over which aluminum film or the like is deposited to form reflective layer 2, and further comprises hologram recording layer 4 composed of recording material and substrate 5 on top of this reflective layer, as shown in FIG. 1.

However, in FIG. 1, not only servo light (red) but also information light and reference light for recording used when recording and reference light for reproducing used when reproducing (all of which are green) reach reflective layer 2 by being irradiated onto the disk and thereby, is reflected and output from incident and output surface A as returning light. A portion of the light reflected from reflective layer 2 is reflected diffusely because reflective layer 2 is not completely flat. This diffused reflection light appears in reproducing light as scattering noise. This is problematic in that the reproduction image cannot be correctly detected by CMOS sensor or CCD and because it is extremely difficult to separate this noise. Because servo light is red light, it can be separated from the green light of information light and recording/reproduction reference lights, and therefore, scattering noise from reflective layer 2 becomes a problem when green light is emitted.

In addition, even when recording, there is a possibility that, when information light and recording/reproduction reference light reach reflective layer 2, are reflected and generate diffused reflection light, this diffused reflection light and the emitted recording/reproduction reference light both generate a different interference pattern. This interference pattern is unnecessary and is problematic in that not only may this become noise during reproduction but the recording medium will not be able to reach its original recording capacity. If the recording medium does not react to red, this will not affect the recording capacity of the recording medium will not be affected even if servo light is reflected slightly diffusely.

SUMMARY OF THE INVENTION

The present invention was made in consideration of these issues, and the object thereof is to provide an optical information recording medium structure which can prevent diffused reflection from the reflective layer of the optical information recording medium due to information light and recording/reproduction reference light and reduce the amount of noise appearing in reproduction images.

The optical information recording medium according to the present invention for recording information using holography comprises a transparent substrate, a recording layer to which information is recorded by interference patterns, and a filter layer provided between the transparent substrate and the recording layer which passes light of a first wavelength and reflects the light of a second wavelength. This filter layer passes light of a first wavelength (for example, red-colored light) and reflects light of a second wavelength (for example, green-colored light), thereby separating lights of two types of wavelengths.

In addition, the transparent substrate has a servo pit pattern, and furthermore, a reflective layer is formed on this pattern. Through this construction, light of the second wavelength cannot reach the reflective layer.

Furthermore, a polarization direction-changing layer for changing the polarization direction of light, for example, a layer composed of a quarter-wavelength board, is provided between the recording layer and the filter layer. Thus, the changing of the polarization direction of light and the generation of ghost images due to reflective holograms can be prevented.

A layer composed of dichroic mirror or a layer composed of cholesteric liquid crystal can be uses as filter layer. In particular, combination with the afore-mentioned quarter-wavelength board layer is effective when using a layer composed of cholesteric liquid crystal as the filter layer, the reason being cholesteric liquid crystal characteristically reflects light of circularly-polarized light of a predetermined direction and transmits other lights.

Still further, the reflective surface formed on the substrate is basically a metallic reflection coating but can also be a medium surface which can record or erase as well as reflect light.

A gap layer for smoothing the substrate surface is provided between the filter layer and the reflective surface. This gap layer, aside from smoothing the substrate surface, works to adjust the size of the hologram recorded in the recording layer.

DESCRIPTION OF THE PREFERRED EMBODIMENTS

First Embodiment

Figure 1:
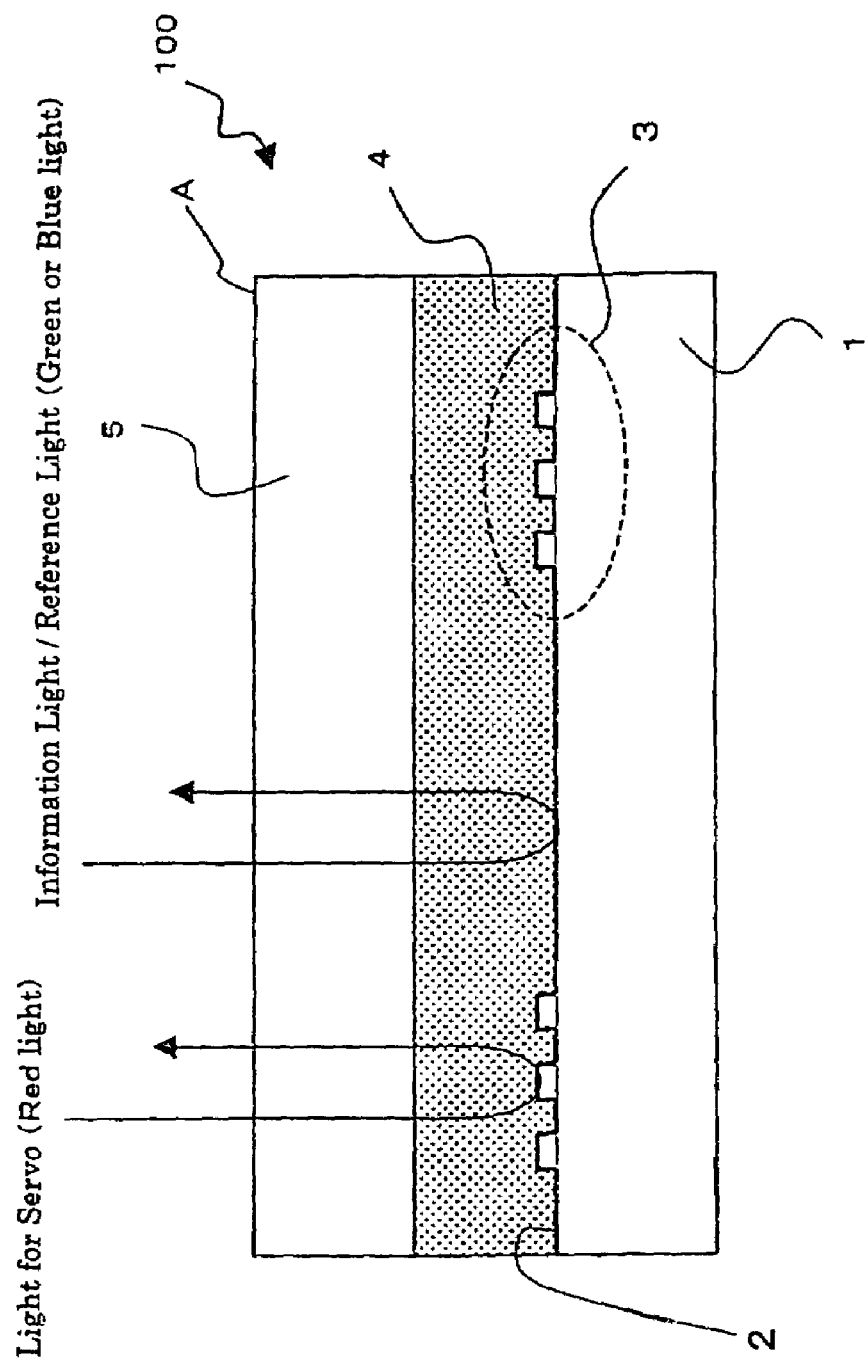
FIG. 1 is a diagram showing the structure of conventional optical information recording medium.
Figure 2:
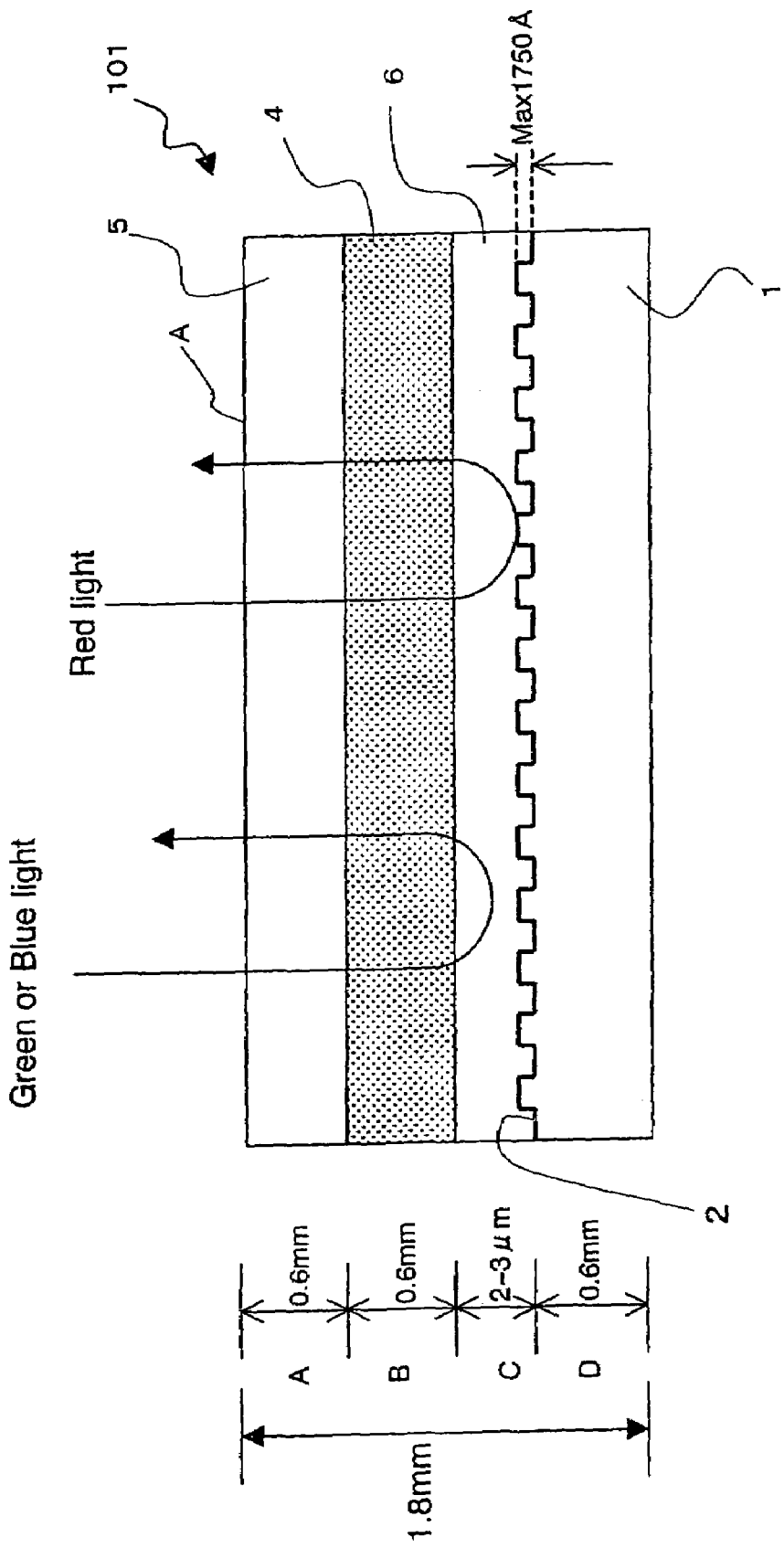
FIG. 2 is a diagram showing a first embodiment of the present invention.

FIG. 2 is a diagram showing the structure of an optical information recording medium according to a first embodiment. In optical information recording medium 101 according to the first embodiment, servo pit is formed on a polycarbonate or glass substrate 1 and is coated with aluminum, gold, platinum, etc. to provide a reflective layer 2. Although, unlike FIG. 1, servo pit is formed on the entire surface of the substrate in FIG. 2, it can also be formed cyclically as in FIG. 1. In addition, the height of this servo pit is 1750 Å maximum and is sufficiently small compared to the thickness of the substrate and other layers.

In addition, a red-colored light transmitting filter layer 6 is provided on substrate 1 with reflective layer 2 and optical information recording medium 100 is constructed by sandwiching hologram recording material which is hologram recording layer 4 between this layer 6 and upper substrate 5 (polycarbonate, glass, etc).

In FIG. 1, the red-colored light transmitting filter layer 6 transmits only red-colored light and does not pass light of other colors. Therefore, because information light and recording/reproducing reference light are green- or blue-colored light, they are not transmitted through filter 6, but become returning light without reaching reflective layer 2 and are output from incident and output surface A. This red-colored light transmitting filter layer 6 is, for example, a cholesteric liquid crystal layer, and Chisso Corporation-product CM-33 and the like can be used. When implementing cholesteric liquid crystal layer, it can be placed within optical information recording medium 101, in an optical information recording medium structure wherein a quarter-wavelength board is placed between filter layer 6 (cholesteric liquid crystal layer) and incident and output surface A. It does not have to be placed within optical information recording medium 101 if a quarter-wavelength board is placed between dichroic mirror 13, hereafter described, and optical information recording medium 101 as an optical structure. This quarter-wavelength board is shifted by a quarter-wavelength for green-colored light only and when the green light incident, it becomes circularly-polarized light. However, if light of other colors (for example, red) is incident, it becomes elliptically-polarized light.

Optical information recording medium 101 according to this embodiment can be disk-shaped or card-shaped. If it is card-shaped, servo pit is not necessary. In addition, in this optical information recording medium 101, substrate 1 has a thickness of 0.6 mm, red-colored light passing filter 6 has a thickness of 2 to 3 μm, hologram recording layer 4 has a thickness of 0.6 mm, and substrate 5 has a thickness of 0.6 mm. The total thickness is approximately 1.8 mm.

Figure 6:
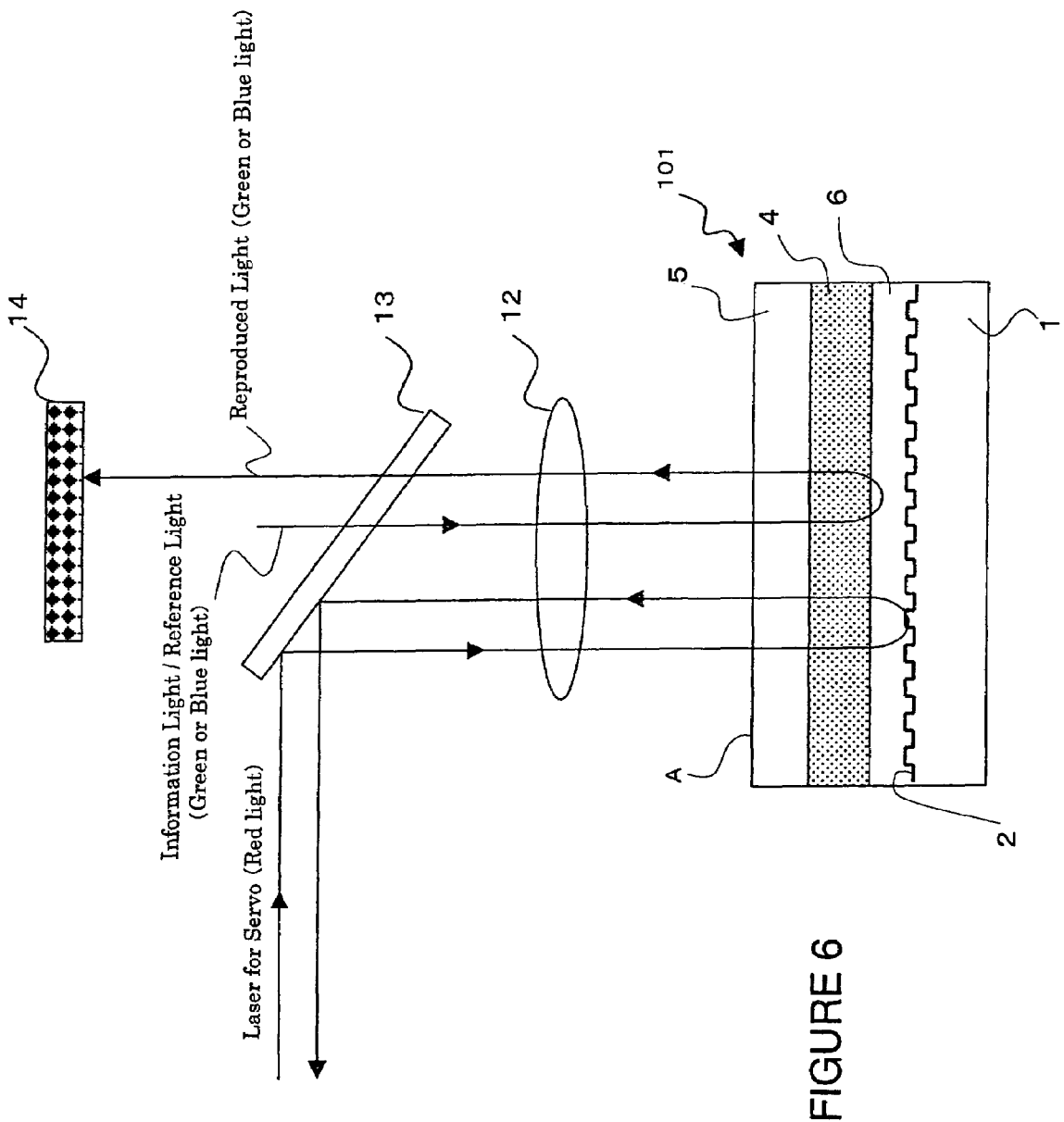
FIG. 6 is a diagram showing the optical system of the vicinity of an optical recording system according to the present invention.

Next, optical operations in the vicinity of optical information recording medium 101 are explained with reference to FIG. 6. First, light (red light) emitted from a servo laser is reflected 100% by dichroic mirror 13 and passes through object lens 12. Servo light is emitted to optical information recording medium 101 by object lens 12 such as to focus on reflective layer 2. In other words, dichroic mirror 13 transmits light of green- and blue-colored wavelengths and reflects light of red-colored wavelength almost 100%. Servo light incident on light incident and output surface A of optical information recording medium 101 is transmitted through substrate 5, hologram recording layer 4 and red-colored transmitting filter layer 6, reflected by reflective layer 2, transmitted through filter layer 6, hologram recording layer 4 and substrate 5 once again, and output from incident and output surface A. The output returning light is transmitted through objective lens 12 and reflected 100% by dichroic mirror 13, and servo information is detected by a servo information detector, which is not illustrated. The detected servo information is used for focus servo, tracking servo, slide servo and the like. Hologram material comprising hologram recording layer 4 does not react to red-colored light, and therefore the hologram recording layer 4 is not affected even when servo light is transmitted through hologram recording layer 4 or diffusedly reflected in reflective layer 2. In addition, returning light of servo light from reflective layer 2 is reflected almost 100% by dichroic mirror 13, and therefore, servo light is not detected by CMOS sensor or CCD14 for detecting reproduction image and does not interfere with reproduction light.

In addition, information light and recording reference light generated by recording/reproduction laser pass through dichroic mirror 13 and are irradiated onto optical information recording medium 101 by object lens 11 such that information light and recording reference light generate interference patterns within hologram recording layer 4. Information light and recording reference light are incident from incident and output surface A, mutually interfere in hologram recording layer 4, and generate interference patterns therein. Subsequently, information light and recording reference light are transmitted through hologram recording layer 4 and incident on red-colored light transmitting filter layer 6. However, they are reflected before reaching the bottom surface of this layer and become returning light. In other words, information light and recording reference light only reach reflective layer 2 because red-colored light transmitting filter layer 6 has characteristics wherein only red-colored light is transmitted.

Second Embodiment

Figure 3:
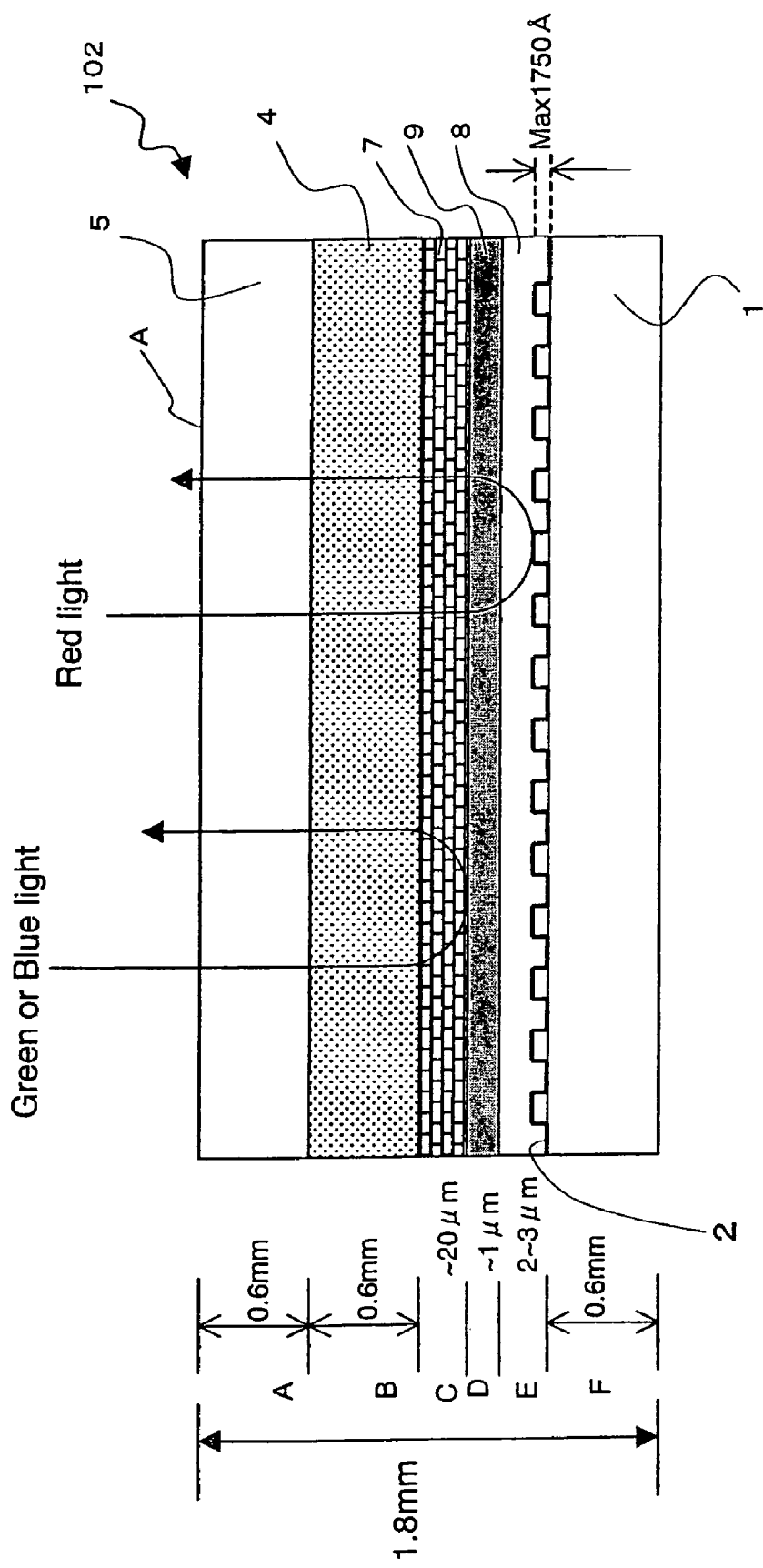
FIG. 3 is a diagram showing a second embodiment of the present invention.

FIG. 3 is a diagram showing the structure of an optical information recording medium according to a second embodiment. In optical information recording medium 102 according to the second embodiment, servo pit is formed on a polycarbonate or glass substrate 1 and is coated with aluminum, gold, platinum, etc. to provide a reflective layer 2. With regards to the height of this servo pit being a maximum of 1750 Å, it is the same as in the first embodiment.

The structural differences between the second embodiment and the first embodiment is that, in optical information recording medium 102 according to the second embodiment, there is a gap layer 8, a dichroic mirror layer 9 is provided in place of filter layer 6 of optical information recording medium 101, and furthermore, a quarter-wavelength board layer 7 is provided between dichroic mirror layer 9 and hologram recording layer 4.

Gap layer 8 is formed on reflective layer 2 of substrate 1 by applying spin coat or the like on material such as UV range. Gap layer 8 protects reflective layer 2 as well as effectively adjusting the size of the hologram generated within hologram recording layer 4. In other words, the interference range of recording reference light and information light must be formed to a certain size in the hologram recording layer 4. Therefore, it is effective to provide a gap between hologram recording layer 4 and the servo pit.

Dichroic mirror layer 9 is formed by dielectric multilayer coating (sputtering) wavelength separation filter on gap layer 8. The dichroic mirror according to the second embodiment has characteristics wherein green-colored light is reflected and lights of other colors (for example, red-colored) are transmitted.

Quarter-wavelength board layer 7 is formed by spin-coating azobenzene, for example, on dichroic mirror layer 9. The film generated by azobenzene is anisotropic and has characteristics wherein molecules are aligned perpendicular to the emitted polarized light. Aside from this, quarter-wavelength board layer 7 can be formed by implementing rubbing processing, as well. When linear polarized light such as P polarized light and S polarized light is incident, quarter-wavelength board layer 7 has characteristics wherein transmitted light is turned into circularly-polarized light from linear polarized light, if the angle of this linear polarized light is 45° to the axis of the optical system of the crystallization in the quarter-wavelength board. Alternately, if circularly-polarized light is incident, it is turned into linear polarized light. In the present embodiment, quarter-wavelength board layer 7 works to eliminate ghosts due to reflective holograms (horizontal fringe), and this layer is not necessary if the influence of ghosts can be ignored.

In addition, in optical information recording medium 102, substrate 1 has a thickness of 0.6 mm, gap layer 8 has a thickness of 2 to 3 µm, dichroic mirror layer 9 has a thickness of 1 µm or smaller, quarter-wavelength board layer 7 has a thickness of 20 µm or smaller, hologram recording layer 4 has a thickness of 0.6 mm, and substrate 5 has a thickness of 0.6 mm. The total thickness is approximately 1.8 mm.

When performing recording or reproduction of information, red-colored servo light, green-colored information light and recording/reproduction reference light are irradiated onto optical information recording medium 102 having a structure such as this. Servo light enters from incident and output surface A, passes through hologram recording layer 4, quarter-wavelength board layer 7, dichroic mirror layer 9, and gap layer 8, is reflected from reflective layer 2 and becomes returning light. This returning light passes through gap layer 8, dichroic mirror layer 9, quarter-wavelength board layer 7, hologram recording layer 4 and substrate 5 once again in sequential order, and exits incident and output surface A. The output returning light is used for focus servo, tracking servo and the like. The hologram material comprising hologram recording layer 4 does not react to red-colored light, and therefore, hologram recording layer 4 is not affected even when servo light passes through hologram recording layer 4 or is diffusedly reflected in reflective layer 2. Green-colored information light and the like enters from incident and output surface A, passes through hologram recording layer 4, quarter-wavelength board layer 7, is reflected from dichroic mirror layer 9 and becomes returning light. This returning light passes through quarter-wavelength board layer 7, hologram recording layer 4 and substrate 5 once again in sequential order, and exits incident and output surface A. Additionally, when reproducing, reproduction reference light, as well as reproduction light generated by irradiating hologram recording layer 4 with reproducing reference light is output from incident and output surface A without reaching reflective layer 2. With regards to reproduction light, whether or not it is reflected by dichroic mirror layer 9 is determined by the recording method, namely, recording reflective hologram or transparent hologram.

Optical operations in the vicinity of optical information recording medium 102 (object lens 12, dichroic mirror 13 and CMOS, a detector, and CCD14) are the same as that in the first embodiment, and therefore, explanations are omitted.

Third Embodiment

Figure 4:
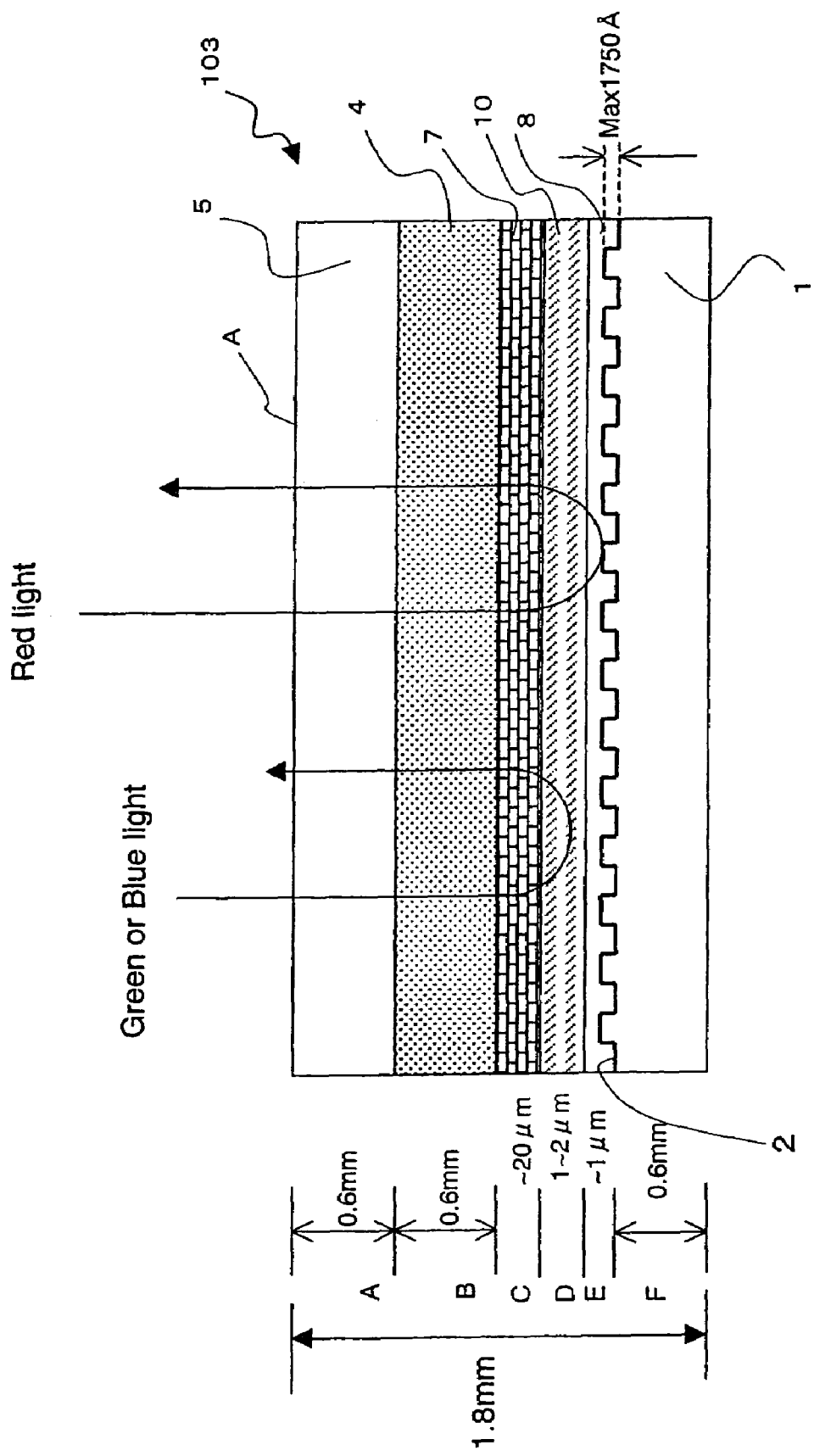
FIG. 4 is a diagram showing a third embodiment of the present invention.

FIG. 4 is a diagram showing the structure of an optical information recording medium according to a third embodiment. In optical information recording medium 103 according to the third embodiment, a cholesteric liquid crystal layer 10 is provided in place of dichroic mirror layer 9 in the second embodiment. Other structures are the same as the second embodiment.

The thickness of this cholesteric liquid crystal layer 10 is also 1 to 2 µm, and as with the other embodiments, the thickness of the entire optical information recording medium is approximately 1.8 mm.

Cholesteric liquid crystal layer 10 is formed by applying, for example, cholesteric liquid crystal CM-33 (Chisso Corporation product), which is a chiral dopant, after forming gap layer (smooth layer) 8, and spin-coating. Cholesteric liquid crystal has characteristics wherein light is reflected when circularly-polarized light of a predetermined direction is incident, and light is transmitted when other light, for example, linear polarized light and elliptically-polarized light, is incident.

In the third embodiment, quarter-wavelength board layer 7 has characteristics wherein it is shifted by a quarter-wavelength for only green-colored light. In other words, in quarter-wavelength board layer 7, if green linear polarized light (information light and reference light) is incident, it is changed to green circularly-polarized light, and if red linear polarized light (servo light) is incident, it is changed to red elliptically-polarized light. Therefore, green-colored information light and reference light which have been changed from linear polarized light to circularly-polarized light by quarter-wavelength board layer 7 are reflected in the cholesteric liquid crystal layer 10 and do not reach reflective layer 2. In addition, red-colored servo light which has been changed from linear polarized light to elliptically-polarized light by quarter-wavelength board layer 7 pass through cholesteric liquid crystal layer 10, reach reflective layer 2, and the returning light is used for focus servo, tracking servo and the like.

Fourth Embodiment

Figure 5:
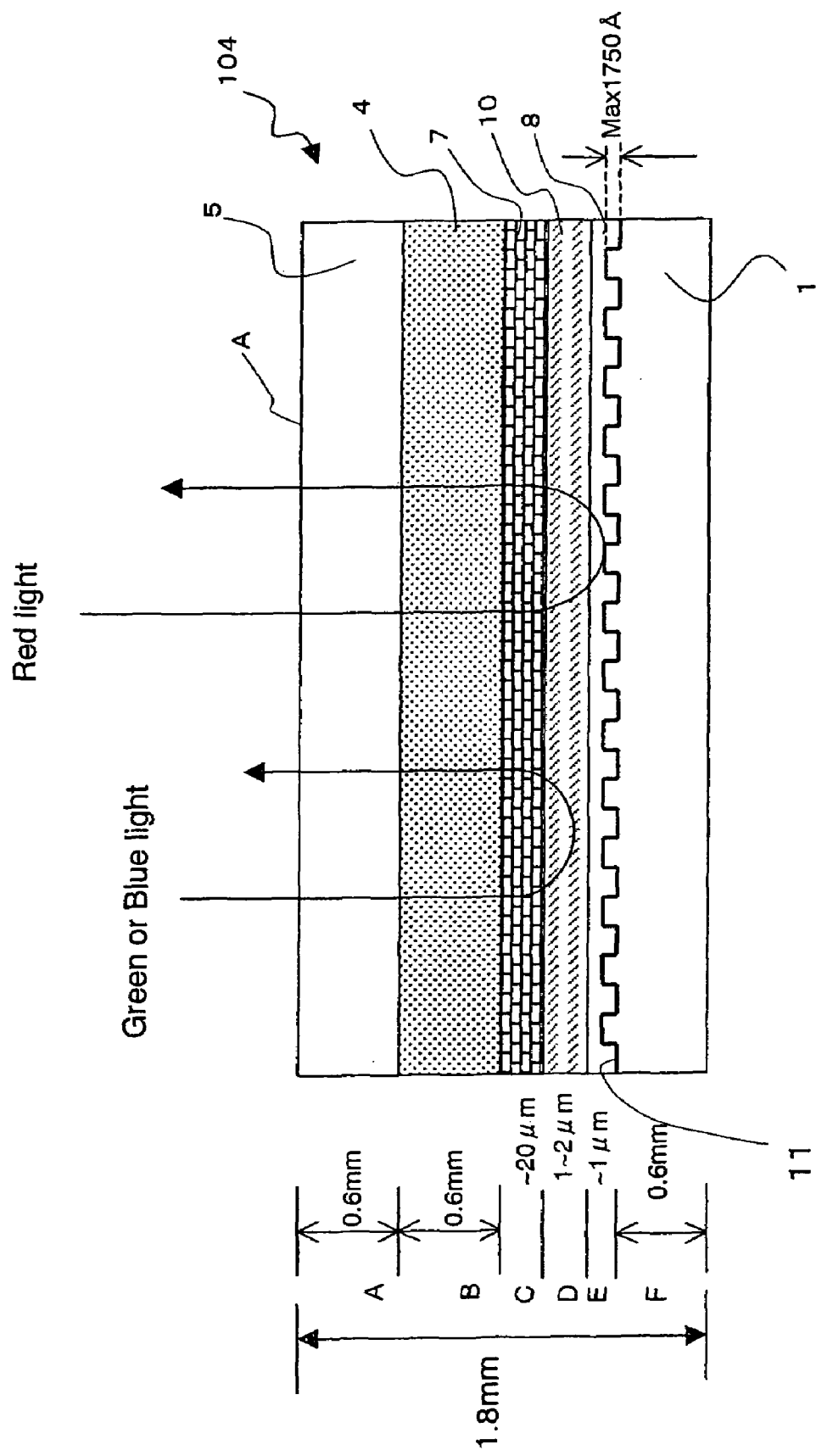
FIG. 5 is a diagram showing a fourth embodiment of the present invention.

FIG. 5 is a diagram showing the structure of an optical information recording medium according a fourth embodiment. In optical information recording medium 104 according to the fourth embodiment, reflective layer 2 according to the third embodiment is not a mere metallic reflective film as in Al, but is a recording medium which can be added or overwritten, such as that treated with phase-change film. Other structures are the same as the third embodiment, and therefore, explanations are omitted. Therefore, the effects of cholesteric liquid crystal layer 10 are the same as that in the third embodiment, and thus, explanations are omitted.

In optical information recording medium 100 having the structure in FIG. 1, because high light intensity information light and reference light (green-colored light) also converge on this reflective surface when recording holograms, ensuring reliability is problematic even when giving reflective layer 2 write function using the same red-colored light as servo light. In addition, the reflection rate of these films enabling write or over-write is not very high, and therefore, problems exist in that the reproduction efficiency of the holograms is reduced.

However, because reflection rate for green-colored light can be independently set by cholesteric liquid crystal layer 10 which is a wavelength separation layer through the method according to this embodiment, this is advantageous in that reflective layer 11 for red-colored light for acquiring servo can have low reflection rates.

Effects of Each Embodiment

According to each embodiment, because two different wavelengths are separated efficiently, the two different wavelengths (red-colored light and green-colored light) can be used for separate purposes without being influenced by each other.

In addition, a polarization direction-changing layer for changing the polarization direction of light, for example, a layer composed of a quarter-wavelength board, is provided between the recording layer and the filter layer. Thus, the changing of the polarization direction of light and the generation of ghost images due to reflective holograms can be prevented.

Furthermore, according to each embodiment, information light and reference light used when recording and reproducing and reproduction light do not reach reflective layer 2 or 11, the generation of diffused light on the reflective surface can be prevented. Therefore, noise generated by this diffused light are not superimposed on the reproduction image nor detected by CMOS sensor or CCD14, and noise can be detected to a degree enabling at least error correction of the reproduction image. Noise elements due to diffused light become more problematic, the larger the multiplicity of the hologram. In other words, the larger the multiplicity becomes, for example one thousand or more, the smaller the diffraction efficiency from one hologram becomes, making the detection of reproduction image extremely difficult if there are diffusion noise. According to the present invention, these difficulties can be eliminated, and therefore, this is effective. In addition, by having a structure as such, servo pit can be obtained from any form of pre-pit structure and is not limited to sample servo, unlike the conventional optical information recording medium in FIG. 1. Furthermore, the space between pits can be placed without being influenced by hologram size.

Still further, in the second to fourth embodiments, because polarizations of incident light and output light of quarter-wavelength board layer 7 are orthogonalized and almost all reproduction light can be detected due to un-illustrated polarization beam splitter implemented in recording/reproduction optical systems, light utilization efficiency is high and these inventions are optically superior. In addition, this combination is extremely effective for eliminating unnecessary stray lights such as surface reflections from optical elements generated on the laser light source side which is not illustrated, compared to quarter-wavelength board layer 7.

Still further, because the allocation of servo pit and hologram recording are optically separated, recording density never declines regardless of the pit format implemented. Therefore, sufficient frequency band can be given to servo control signal and servo accuracy can be made equal to or higher than conventional optical disks.

Still further, according to the present invention, the reflection rate of the reflection film for servo can be selected freely, and the material of the reflective film can also be chosen freely. Thus, as in the fourth embodiment, recording medium which can be written or over-written, for example DVD (digital video disk), can be used as reflective layer 11, and directory information, such as up to which area hologram is recorded and when over-write was performed, can be written and/or overwritten without affecting the hologram.

Filter layer, which is the wavelength separation layer, can be formed comparably thinner, at micron-level, and therefore, the influence of optical aberration of object lens caused by differences in the reflective surface of filter layer 6 and 9 and the reflective surface of reflective layer 2 and 11 can be ignored.

Although the structure and operation of the present invention have been explained based on the principle and embodiments, the present invention is not limited to the embodiments above, and various modifications are possible within a range which does not deviate from the main object of the invention. In particular, in the present invention, although red-colored light is implemented as servo light and green-colored light as recording/reproduction light, it is not limited thereto, and according to the characteristics of the medium, combinations of other wavelengths are also possible. For example, when using chalcogenide material as recording material, blue-colored light is implemented as servo light and red-colored light is implemented as recording/reproduction light. This is because this material reacts to red-colored light.

What is claimed is:

1. An optical information recording medium for recording information using holography, comprising:
    an outer surface of the optical information recording medium which servo light of a first wavelength, information light of a second wavelength and reference light of the second wavelength are incident and output;
    a transparent substrate having a servo pit pattern;
    a reflective surface for reflecting the servo light formed on the servo pit pattern of the transparent substrate;
    a recording layer for recording information recorded by interference pattern formed as a result of interference between the information light and the reference light that are incident from the outer surface; and
    a filter layer provided between the transparent substrate and the recording layer wherein light of the first wavelength is transmitted and light of the second wavelength is reflected.

2. The optical information recording medium according to claim 1 wherein a polarization direction-changing layer for changing the polarization direction of light is formed between said recording layer and said filter layer.

3. The optical information recording medium according to claim 2 wherein said polarization direction-changing layer is a layer composed of quarter-wavelength board.

4. The optical information recording medium according to claim 1 wherein said filter layer is a layer composed of dichroic mirror.

5. The optical information recording medium according to claim 2 or 3 wherein said filter layer is a layer composed of cholesteric liquid crystal.

6. The optical information recording medium according to claim 5 wherein said polarization direction-changing layer changes said light of a second wavelength to a circularly-polarized light of a predetermined direction and changes said light of a first wavelength to polarized light other than the circularly-polarized light of a predetermined direction.

7. The optical information recording medium according to claim 1 wherein said reflective surface is a metallic reflective film.

8. The optical information recording medium according to claim 1 wherein said reflective surface is a medium surface which can be written or over-written in addition to reflecting light.

9. The optical information recording medium according to claim 1 wherein a gap layer is provided between said filter layer and said reflective surface to smoothen said substrate surface.

* * * * *